(12) United States Patent
Brunermer et al.

(10) Patent No.: US 10,144,207 B2
(45) Date of Patent: Dec. 4, 2018

(54) THREE-DIMENSIONAL PRINTING EXCESS DEPOSITED PARTICULATE HANDLING

(71) Applicant: The ExOne Company, North Huntingdon, PA (US)

(72) Inventors: Daniel T. Brunermer, Leechburg, PA (US); Anthony S. Dugan, McKeesport, PA (US); Thomas Lizzi, Harmony, PA (US)

(73) Assignee: The ExOne Company, North Huntingdon, PA (US)

( * ) Notice: Subject to any disclaimer, the term of this patent is extended or adjusted under 35 U.S.C. 154(b) by 270 days.

(21) Appl. No.: 15/319,288

(22) PCT Filed: May 7, 2015

(86) PCT No.: PCT/US2015/029578
§ 371 (c)(1),
(2) Date: Dec. 15, 2016

(87) PCT Pub. No.: WO2015/171841
PCT Pub. Date: Nov. 12, 2015

(65) Prior Publication Data
US 2017/0120536 A1    May 4, 2017

Related U.S. Application Data

(60) Provisional application No. 62/013,584, filed on Jun. 18, 2014, provisional application No. 61/990,439, filed on May 8, 2014.

(51) Int. Cl.
| | |
|---|---|
| *B29C 67/00* | (2017.01) |
| *B33Y 40/00* | (2015.01) |
| *B41J 2/17* | (2006.01) |
| *B41J 29/02* | (2006.01) |
| *B33Y 10/00* | (2015.01) |
| *B33Y 30/00* | (2015.01) |

(Continued)

(52) U.S. Cl.
CPC ............ *B33Y 40/00* (2014.12); *B29C 64/153* (2017.08); *B29C 64/165* (2017.08);
(Continued)

(58) Field of Classification Search
CPC ......... B33Y 10/00; B33Y 30/00; B33Y 40/00; B33Y 50/00; B33Y 50/02
See application file for complete search history.

(56) References Cited

U.S. PATENT DOCUMENTS

419,751 A * 1/1890 Cook
3,445,973 A * 5/1969 Stone .................... E03F 5/0407
                                                210/163
(Continued)

*Primary Examiner* — Ryan M Ochylski
(74) *Attorney, Agent, or Firm* — Thomas Lizzi (57) ABSTRACT

A three-dimensional printing apparatus is disclosed has one or more troughs for receiving excess deposited particulate. Such troughs may be positioned to receive the excess deposited particulate into a particulate receiving chamber of the trough. An evacuation chamber is located at the bottom of each trough. A partition separates the evacuation chamber from the receiving chamber of the trough. The partition is selectively perforated to permit a desired amount of the particulate to flow into the evacuation chamber from the receiving chamber. The evacuation chamber is connected to a vacuum source to periodically or continuously draw ambient gas from a gas inlet to the evacuation chamber and/or from the receiving chamber through the perforations of the partition and then through the evacuation chamber toward the vacuum source to entrain an amount of the particulate and carry the entrained particulate out of the evacuation chamber.

8 Claims, 7 Drawing Sheets

(51) Int. Cl.
*B29C 64/153* (2017.01)
*B29C 64/165* (2017.01)
*B29C 64/357* (2017.01)
*B29K 105/00* (2006.01)

(52) U.S. Cl.
CPC ............ *B29C 64/357* (2017.08); *B33Y 10/00* (2014.12); *B33Y 30/00* (2014.12); *B41J 2/1714* (2013.01); *B41J 29/02* (2013.01); *B29K 2105/251* (2013.01)

(56) References Cited

U.S. PATENT DOCUMENTS

| | | | | |
|---|---|---|---|---|
| 6,007,318 | A * | 12/1999 | Russell | B29C 41/12 425/130 |
| 2006/0214335 | A1* | 9/2006 | Cox | B01F 3/188 264/497 |
| 2008/0006334 | A1* | 1/2008 | Davidson | B33Y 30/00 137/571 |
| 2008/0241404 | A1* | 10/2008 | Allaman | B29C 64/165 427/333 |
| 2010/0043698 | A1* | 2/2010 | Bolt | B33Y 30/00 118/46 |
| 2012/0052145 | A1* | 3/2012 | Chen | B08B 5/02 425/217 |
| 2012/0308332 | A1* | 12/2012 | Jackson | B29C 67/0051 411/392 |
| 2013/0321540 | A1* | 12/2013 | Platt | B41J 2/175 347/89 |
| 2014/0065194 | A1* | 3/2014 | Yoo | B33Y 10/00 424/400 |

* cited by examiner

THREE-DIMENSIONAL PRINTING EXCESS DEPOSITED PARTICULATE HANDLING

FIELD OF THE INVENTION

The present invention relates to apparatuses for handling excess deposited build particulate from the spreading of particulate layers in three-dimension printers. The present invention also relates to methods of handling such excess deposited particulate.

BACKGROUND OF THE INVENTION

Conventional three dimensional printing processes take various forms. Nearly all involve the slicing of a software representation of a three-dimensional article into software representations of two-dimensional slices of the article and then building the article in three-dimensions by sequentially transforming such two-dimensional representations into physical layers built one upon another. Several three-dimensional printing processes make use of particulates (also sometimes referred to in the art as "powder" or "particles") for building the article in three dimensions. Among these processes are the binder jetting process (also known as the inkjet printing process), selective layer sintering process, selective laser melting process, direct metal laser sintering process, electron beam melting process, and the selective heat sintering process.

In the three-dimension printing processes that use particulates, a first layer of the particulates is deposited onto the top surface of a build platform. This deposition is sometimes referred to in the art as "spreading" a particulate layer. An image of the two-dimensional representation of the first slice of the article may then be imparted to this first particulate layer or the first particulate layer may be covered over with one or more additional particulate layers before the image of the first slice of the article is imparted to the then-topmost particulate layer. After that, the sequence of applying a particulate layer and imparting the image of the two-dimensional representation of a subsequent slice of the article is performed until the three-dimensional article is formed. The top surface of the bare build platform or of the then-topmost particulate layer is referred to herein as the "build surface". Often, more than one article or multiple copies of the same article are produced at the same time by simultaneously imparting the respective two-dimensional slices of the articles onto the build surface particulate layers. At the end of the particulate layer-placing plus image-imparting iterative sequence, particulate-based versions of the article or articles are surrounded by a bed of the unbonded particulates. This bed is sometimes referred to as a "build bed" or as a "powder bed" or as a "particulate bed".

The particulate processes commonly use a support platform which is designed to be step-wise lowered into a walled cavity. At the start of the process, the support platform is positioned so that the support surface is flush with the top of the cavity walls. After each particulate layer-placing plus image-imparting iteration, the support platform is indexed down into the cavity so that the then-topmost particulate layer is flush with the cavity walls so that the next particulate layer can be deposited.

Various techniques have been devised for depositing the particulate layers, but a common problem occurs with particulate layer deposition that is due to the nature of particulate flow in normal-level gravity fields. Unlike layers of continuous solid materials, e.g. sheets of metal, plastic, or paper, the particulate layers do not terminate in sharply-defined vertical walls, but rather in somewhat irregular edges with generally downwardly-outward sloping walls, the contours of which roughly relate to the angle of repose of the particulates and depend on various material and dynamic factors, e. g. the inter-particle attractive/repulsive forces of the particulates, the velocity vectors active on the particulates during layer deposition, the presence of additives, coatings, or absorbed or adsorbed chemical species on the particulates, environmental forces such as vibrations, etc. Usually, in order to assure that the build surface always has the same predictable dimensions of the initial support surface, an excess amount of particulates is deposited for each layer. However, unless some provision is made for removing the excess deposited particulates, it is likely that the accumulation of the excess deposited particulates after the deposition of one or more layers will interfere with the desired deposition of additional layers.

A common way of handling the excess deposited particulate problem is to provide one or more receiving troughs into which the excess deposited particulate can fall or be pushed. However, sizing the receiving troughs can be problematic. Making the troughs too large requires making the overall size of the three-dimensional printing apparatus larger than it needs to be. Making the troughs too small may result in the troughs becoming ineffective upon overfilling or require the use of reservoirs which take in the particulates directly or indirectly from the trough or troughs. Also, adding to the problem is the fact that the effective bulk density of the particulate as deposited can change from one type of particulate to another and even from batch-to-batch for the same type of particulate. Furthermore, in order to prevent cross-contamination, the troughs and associated reservoirs must be thoroughly cleaned before the three dimensional printing apparatus can be utilized with another type of particulate.

SUMMARY OF THE INVENTION

The present invention addresses the above-stated sizing problem by providing a three-dimensional printing apparatus which has one or more troughs for receiving the excess deposited particulate. Preferably such troughs are positioned parallel or perpendicular to the particulate deposition direction to receive the excess deposited particulate into a particulate receiving chamber of the trough. An evacuation chamber is located at the bottom of each trough. A partition separates the evacuation chamber from the receiving chamber of the trough. The partition is selectively perforated to permit a desired amount of the particulate to flow into the evacuation chamber from the receiving chamber. The evacuation chamber is connected to a vacuum source to periodically or continuously draw ambient gas (usually air) from a gas inlet to the evacuation chamber and/or from the receiving chamber through the perforations of the partition and then through the evacuation chamber toward the vacuum source so as to entrain a desired amount of the particulate and carry the entrained particulate out of the evacuation chamber where it may be collected in a collection vessel or otherwise disposed of.

Some preferred embodiments of the present invention also address the above-stated cleaning problem. In these embodiments, the inventive apparatus includes a build box having one or more troughs of the character described in the previous paragraph. The build box is designed to be removable from the three-dimensional printer apparatus. The build box includes walls configured to confine the particulate bed from lateral flow and a build platform which is adapted to be raised or lowered.

The present invention also includes methods of removing excess deposited particulate by capturing the particulate in a trough which has a receiving chamber and an evacuation chamber separated by a selectively perforated partition, and connecting the evacuation chamber to a vacuum source so that ambient gas is drawn from the receiving chamber through the perforations of the partition and the gas entrains a desired amount of the particulate and carries the entrained particulate out of the evacuation chamber.

In some preferred embodiments of the present invention, the perforations in the partition are adapted to be selectively opened and closed, thus providing the user with the ability to adjust the gas flow path through the partition through selected perforations.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

DESCRIPTION OF PREFERRED EMBODIMENTS

In this section, some preferred embodiments of the present invention are described in detail sufficient for one skilled in the art to practice the present invention without undue experimentation. It is to be understood, however, that the fact that a limited number of preferred embodiments are described herein does not in any way limit the scope of the present invention as set forth in the claims. It is to be understood that whenever a range of values is described herein or in the claims that the range includes the end points and every point therebetween as if each and every such point had been expressly described. Unless otherwise stated, the word "about" as used herein and in the claims is to be construed as meaning the normal measuring and/or fabrication limitations related to the value which the word "about" modifies. Unless expressly stated otherwise, the term "embodiment" is used herein to mean an embodiment of the present invention.

Prior to describing preferred embodiments, FIGS. 1A-1D and FIG. 2 are presented to provide a better understanding of the excess deposited particulate problem. It should be understood that the particulates may range in nominal size from about a micron to about a millimeter in effective diameter and usually consist of a range of sizes, the smallest of which may be submicron in effective diameter.

Figure 1A:
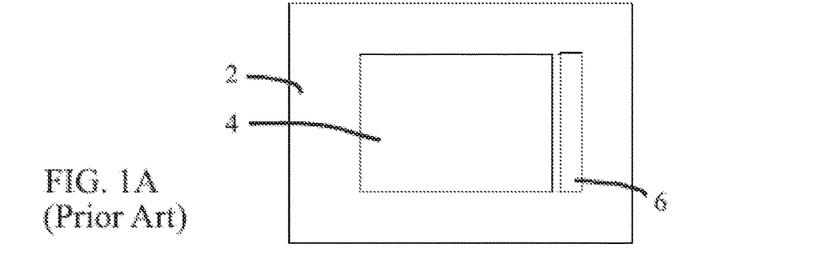
FIG. 1A is a schematic top view of a work table surface of a prior art three-dimensional printing apparatus that uses a particulate build material. The work table surface is shown prior to the deposition of the first particulate layer and does not have troughs for receiving excess deposited particulate material.

FIG. 1A shows a schematic top planar view of a work table surface 2 of a three-dimensional printer that uses a particulate build material. The work table 2 here forms a curtilage around a build platform 4 that is configured to be step-wise lowered into a build cavity (not shown). Also shown in the drawing is a particulate dispenser 6 which is adapted to move above and across the work table surface 2 and the build platform 4 in the direction of arrow 8 (see FIG. 1B), i.e., the particulate layer "deposition direction" or "spread direction", and to selectively deposit a predetermined amount of particulate as it moves along. The work table surface 2 is shown prior to the deposition of a first particulate layer and does not have troughs for receiving excess deposited particulate material.

Figure 1B:
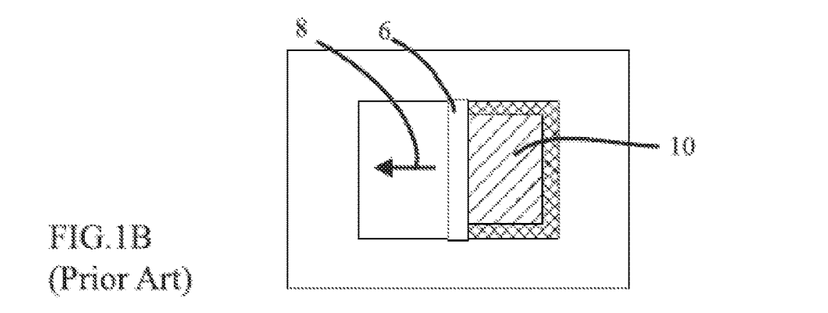
FIG. 1B is a schematic top view of the work table surface of FIG. 1B halfway through the deposition of the first particulate layer.
Figure 1C:
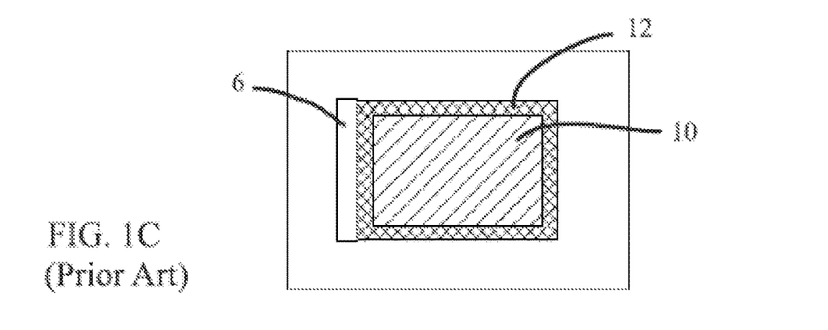
FIG. 1C is a schematic top view of the work table surface of FIG. 1B after the completion of the deposition of the first particulate layer.

FIG. 1B shows the scene of FIG. 1A when the particulate dispenser 6 is partway in its journey and has partially deposited a first particulate layer 10 (indicated by hashing). FIG. 1C shows the scene after the particulate dispenser 6 has completed depositing the first particulate layer 10. Note that first particulate layer 10 covers the build platform 4 and extends onto portions of the work table surface 2 immediately surrounding the build platform 4. The excess deposited particulate 12 (indicated by double hashing) beyond the particulate needed to just cover the build platform 4 (indicated by single hashing) serves no purpose other than to assure that the first particulate layer 10 fully covers the build platform 4.

Figure 1D:
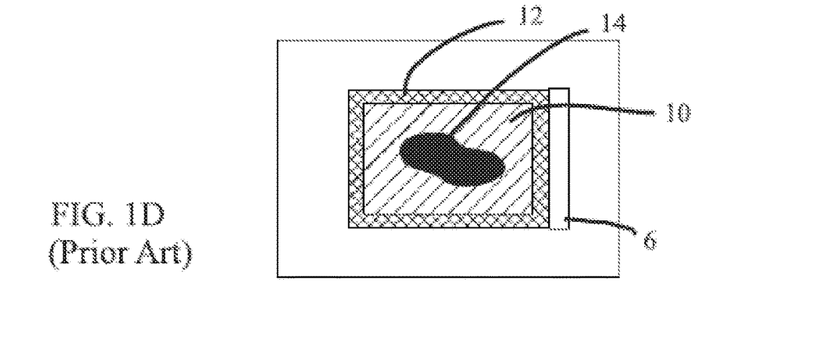
FIG. 1D is a schematic top view of the work table surface of FIG. 1C after an image has been imparted to the first particulate layer and the build platform has been indexed to receive a second particulate layer.

FIG. 1D shows the scene after the image 14 of the first slice of the article that is being built has been imparted to the first particulate layer 10 and the build platform 4 has been indexed downward a distance equal to a layer thickness and the particulate dispenser 6 has been moved back into position to deposit the second particulate layer. Unless an operation has been conducted to remove the excess deposited particulate 12—and none has been removed in the scene shown in FIG. 1D—the excess deposited particulate 12 remains on the surface of the work table 2 and may interfere with the deposition of a second particulate layer and the movement of the particulate dispenser 6 as it deposits the second particulate layer.

Various schemes have been developed to handle the excess deposited particulate. Such schemes typically involve using some sort of a trough and/or reservoir that is part of the three-dimensional printer apparatus to collect the excess deposited particulate. The reservoir or reservoirs may be fed by troughs in the curtilage area or directly receive the excess deposited particulate. The excess deposited particulate may fall into a trough or reservoir directly or be mechanically pushed into a trough or reservoir, e.g. by the particulate dispenser or blades attached to the particulate dispenser.

Figure 2:
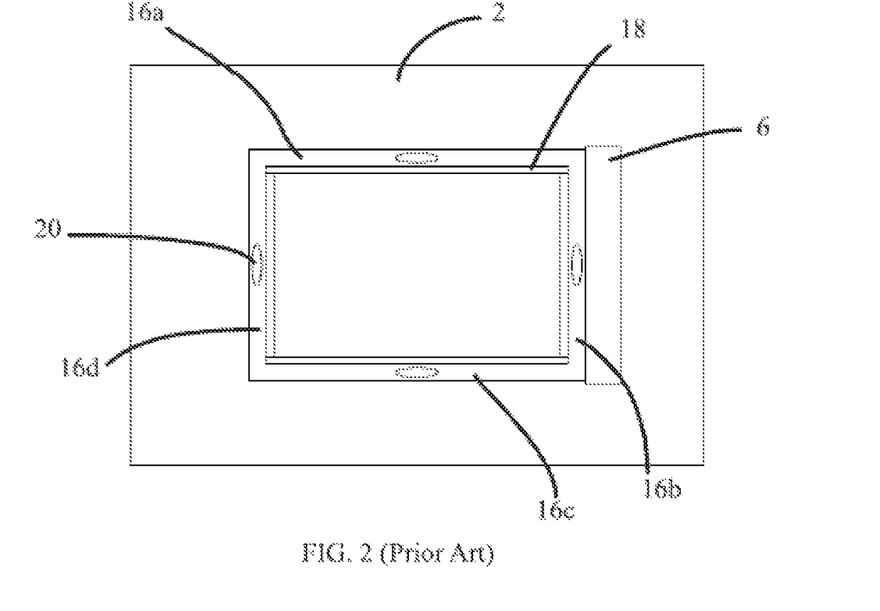
FIG. 2 is a schematic top planar view of a work table surface of a prior art three-dimensional printing apparatus which includes troughs.

FIG. 2 shows a schematic top planar view of the work table surface 2 which has been modified to include troughs 16a-16d surrounding the build platform 4. The inner walls of the troughs 16a-16d, e.g. inner wall 18, separate the interiors of the troughs 16A-16D from the build platform 4. The troughs 16a-16d are sized to receive the excess deposited particulate described above with regard to FIGS. 1C and 1D. The troughs 16a-16d may be sized to contain all of the excess deposited particulate that is expected to be deposited during the building of an article. Alternatively, one or more of the bottoms of the troughs 16a-16d slope toward an exit, e.g. exit 20 of the trough 16d, to convey the excess deposited particulate to one or more collection reservoirs (not shown).

Figure 3:
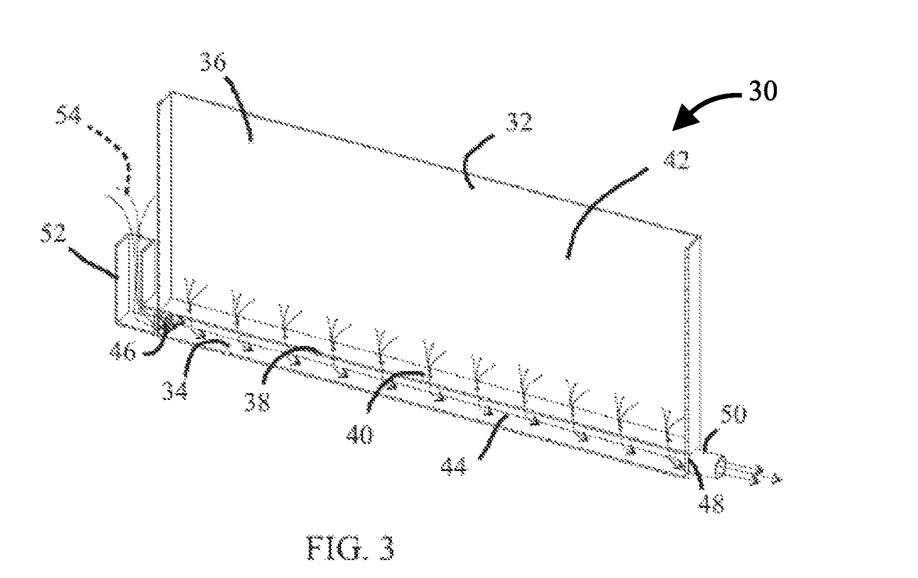
FIG. 3 is a schematic, perspective, cross-sectional view of a trough having an evacuation chamber in accordance with an embodiment of the present invention.

Descriptions of preferred embodiments will now be presented. FIG. 3 is a schematic, perspective, cross-sectional view of a trough 30 in accordance with the present invention. The trough 30 has four vertical walls, e.g. vertical wall 32, a bottom wall 34, and a top opening 36. The trough 30 also has a perforated partition 38 which contains a plurality of through-holes, e.g. hole 40. The partition 38 divides the space within the trough 30 into a particulate receiving chamber 42 and an evacuation chamber 44. An optional gas inlet 46 is located at one end of the evacuation chamber 44 and a gas outlet 48 is located at the opposite end of the evacuation chamber 44. A nipple 50 is connected to the gas outlet 48 and is adapted to be attached to a vacuum source (not shown). The gas inlet 46 is preferably provided with some form of a particulate outflow restrictor 52 which controls the amount of particulate which can flow out of the evacuation chamber 44 through the gas inlet 46. The particulate outflow restrictor 52 shown is in the form of hollow box having one side in communication with the gas inlet 46 and its top side open so as to permit inflow of the ambient atmosphere. The streamline arrows 54 show the direction of gas flow when the evacuation chamber 44 is operatively connected to the vacuum source. As indicated by the streamline arrows 54, the pressure differential imposed by the vacuum source causes ambient gas (e.g. air) to flow into the evacuation chamber 44 through the open top side of the particulate outflow restrictor 52 and then the gas inlet 46 and in through the holes in the partition 38 and exit the evacuation chamber 44 through the nipple 50. Particulates which are in the evacuation chamber 44 or about to enter the evacuation chamber 44 through the holes in the partition 38 may be entrained in the gas flow and exit the evacuation chamber 44 through nipple 50 to be carried off to a collection device, e.g. a cyclone or a screen separator, or otherwise disposed of.

The partition 38 is shown in FIG. 3 as being flat and horizontally disposed within the space of the trough 30. However, other configurations and dispositions of a trough's partition are within the scope of the present invention. For example, the partition may be disposed at any desired acute angle from the horizontal. FIGS. 4-6 and 11-12 give examples of some of the various configurations the partitions of the present invention can take.

Figure 4:
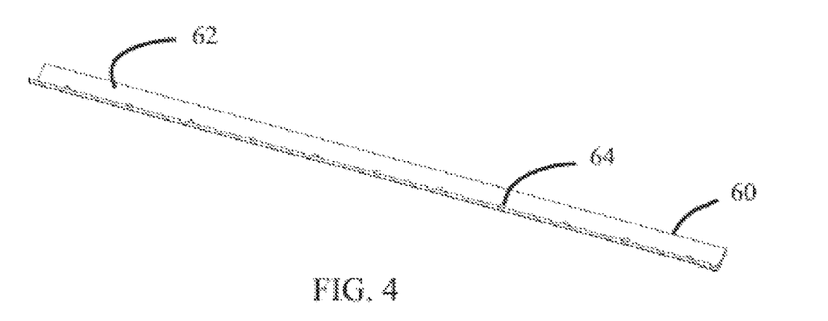
FIG. 4 is a schematic perspective view of a trough partition in accordance with an embodiment of the present invention.

Referring to FIG. 4, there is shown a schematic perspective view of a partition 60. The top surface 62 of partition 60 is concave across its width. This shape encourages the flow of particulate down into each of the holes 64 located along the length of the partition 60.

Figure 5:
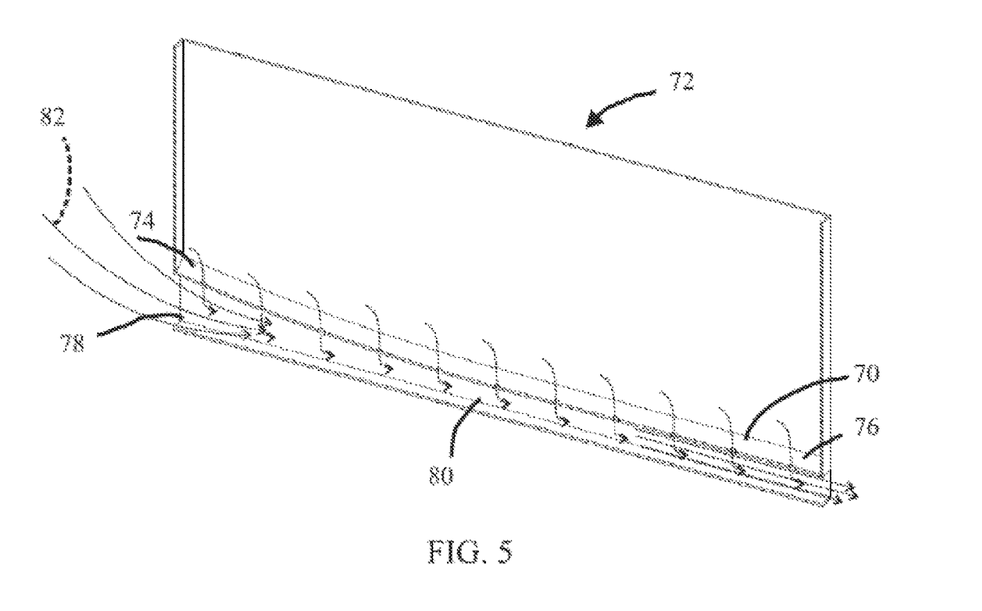
FIG. 5 is a schematic longitudinal mid-plane cross-sectional view of a partition disposed within a trough in accordance with an embodiment of the present invention.

FIG. 5 shows a schematic longitudinal mid-plane cross-sectional view of another partition 70 disposed within a trough 72. The profile of the partition 70 has a semi-parabolic slope from its first end 74 to its second end 76. When the partition's 70 first end 74 is placed adjacent to the gas inlet end 78 of the evacuation chamber 80, this profile shapes the evacuation chamber 80 to enhance the acceleration of gas flow and the sweeping away of particulates through the evacuation chamber 80 as indicated by the streamline arrows 82.

Figure 6:
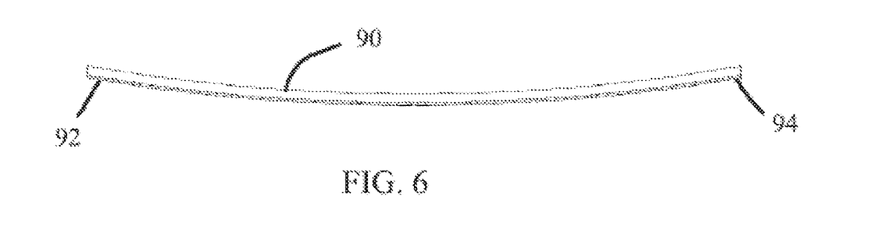
FIG. 6 shows a schematic longitudinal mid-plane cross-sectional view of another partition in accordance with an embodiment of the present invention.

FIG. 6 shows a schematic longitudinal mid-plane cross-sectional view of another partition 90. The partition 90 slopes from its first and second ends 92, 94 down toward its middle to encourage particulate flow toward the middle of the partition 90.

Figure 11:
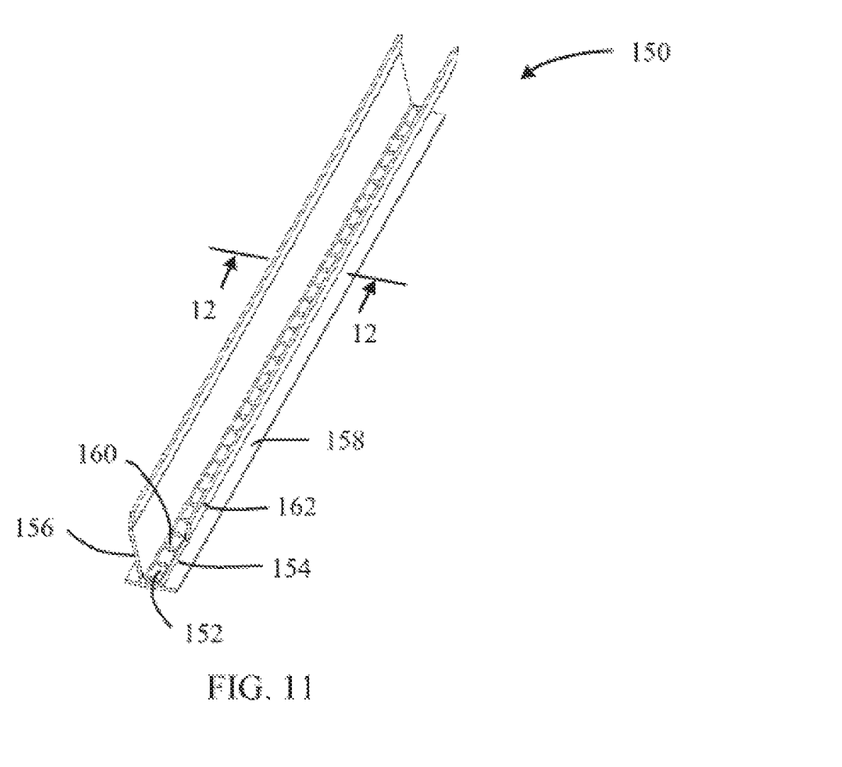
FIG. 11 is a schematic perspective view of a partition in accordance with an embodiment of the present invention.

FIG. 11 shows a schematic perspective view of another partition 150. The partition 150 has a flat bottom wall 152, two sidewalls 154, 156, and an optional horizontal stiffener 158. The bottom section 152 has a plurality of perforations, e.g. perforation 160. Each of the sidewalls 154, 156 extends upward from the bottom wall 152 at a preselected included angle. Preferably the included angle is in the range of from about 5 to 90 degrees. Each of the sidewalls is shown as having an optional extension, e.g., sidewall extension 162 of sidewall 154, which is adapted to be parallel to the trough vertical wall in which the trough is used (e.g. vertical wall 32 of trough 30 in FIG. 3). When used, a sidewall extension allows the sidewall to better seal against the sides of the trough with which the partition is used. The horizontal stiffener 158 is attached to the bottom 152 and the perforations extend through the horizontal stiffener 158. When used, a horizontal stabilizer preferably extends horizontally to engage the vertical wall of the trough into which the partition used so as to help position the partition within the trough in which the partition is used.

In some embodiments, one or more of the perforations of one or more of the partitions are adapted to be selectively opened or closed, thus providing the user with the ability to adjust the gas flow path through the partition through selected perforations. Selectively closing selected partition perforations has the effect of controlling the amount particulate flow through the partition.

Figure 12:
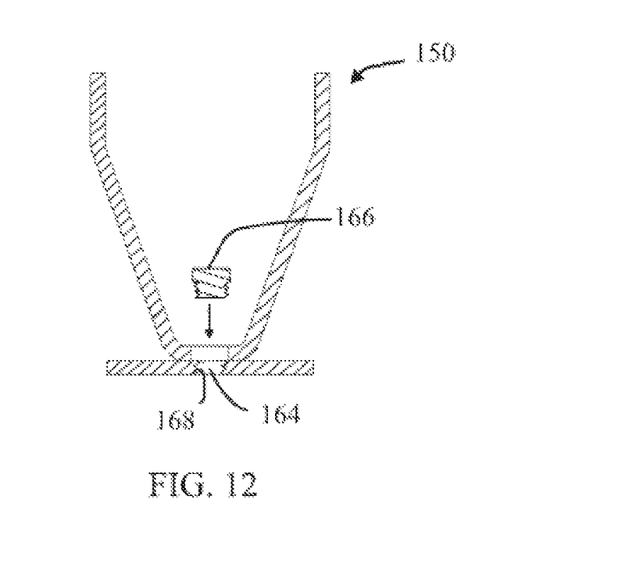
FIG. 12 is a cross-sectional view of the partition of FIG. 11 taken along cutting plane 12-12.

Selectively closing a perforation may be done by securing a plug into the selected perforation and opening a closed perforation is done by removing a plug from the perforation. The plug may be secured by any conventional securing strategy, e.g. by threading the plug and the perforation, by compressing the plug within the perforation, etc. FIG. 12, which is a cross-sectional view of partition 150 of FIG. 11 taken along cutting plane 12-12, shows an example of a perforation 164 which is adapted to receive plug 166. The perforation 164 has threads 168 which are sized to cooperate with the threads of the plug 166 to reversibly secure plug 166 (also shown in cross-section) within the perforation 164 (as indicated by arrow) to close off the perforation 164.

Figure 13:
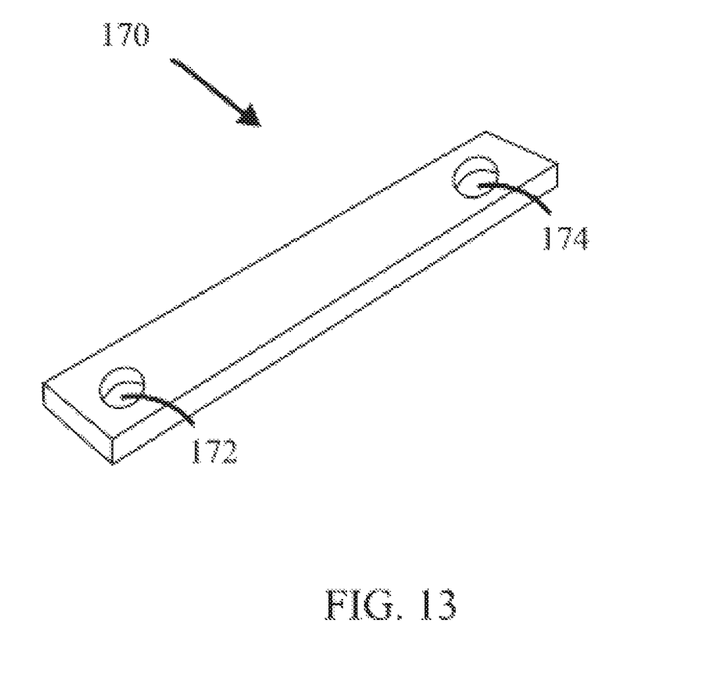
FIG. 13 is a schematic perspective view of a strip that is designed to be used in conjunction with the partition shown in FIGS. 11 and 12 to close a plurality of perforations.

Selectively closing groups of two or more adjacent perforations may be done by attaching a strip to the partition so that the strip covers the selected group of perforations. Preferably, the strip is removably secured to the partition by way of one or more plugs that securingly engage one or more perforations. FIG. 13 shows a schematic perspective view of a strip 170 that is designed to be used in conjunction with the partition shown in FIGS. 11 and 12. The strip 170 has two through-holes 172, 174 which are sized to receive screws (not shown) which extend through through-holes 172, 174 and thread into threaded perforations (e.g. perforation 164 shown in FIG. 11) of partition 150 to secure the strip 170 to the partition 150. The strip 170 is long enough to close five perforations of the partition 150 including the two perforations which are closed off by the screws which secure the strip 170 to the partition 150.

The placement of a trough's partition within the trough's interior space determines both the relative and absolute sizes of the trough's particulate receiving chamber and evacuation chamber. The placement is selected to balance the expected rate of influx of particulate material into the particulate receiving chamber with the expected rate of particulate removal from the evacuation chamber so that the receiving chamber is not allowed to overflow during the three-dimensional printing operation. The rate of influx of particulate into the particulate receiving chamber is dependent on the amount and deposition rates of the excess deposition particulate. The rate of removal of particulate from the evacuation chamber depends, among other things, on the gas flow rate through the evacuation chamber, the particulates' propensity to become entrained in the gas flow, and the amount of time the gas flow is continuously or periodically sustained. Although it is within the scope of the present invention to have the inter-chamber transfer rate of particulates equal that of the particulate receiving chamber's influx rate, it is also within that scope for the transfer rate to be less than that influx rate, so long as this does not result in the overflow of the particulate receiving chamber during the three-dimensional printing operation.

It is to be understood that while it is preferable for the particulate removal rate from the evacuation chamber to be such that particulates do not accumulate within the evacuation chamber over the course of the three-dimensional printing operation, such accumulations are within scope of the present invention, so long as the accumulations do not result in the overflow of the trough during the three-dimensional printer operation.

The selection of the number, size, shape, and locations of the holes in the partition of a trough may be made depending on several factors. Two closely related factors are the size distribution range and the shapes of the particulates that are to be used during the three-dimensional printing operation. It is preferable that the holes be sized and shaped to allow passage of all shapes and sizes within the size distribution range without the occurrence of particulate bridging of the holes. Additional factors are the partition's profile and its angle of disposition. It is preferred that the number and distribution of holes be chosen to avoid the accumulation of particulates on the portion or portions of the partition to which the partition's profile and/or angular disposition direct greater numbers of particulates. Two more factors are the gas flow rate through the evacuation chamber and whether or not a gas inlet (e.g., gas inlet 46 of FIG. 3) has been provided to the evacuation chamber. It is desirable to size, shape, and distribute the holes to promote particulate entrainment in the vacuum-induced gas flow through the holes. It is to be understood that in embodiments wherein the optional gas inlet of the evacuation chamber is omitted, there is no need for a particulate outflow restrictor, e.g. the particulate outflow restrictor 52 shown in FIG. 3. Also, in that case, all gas inflow into the evacuation chamber is through the holes in the partition.

In some embodiments, the partition may be removed from its trough and replaced with a substitute partition. The substitute partition may have holes which are different in number, size, shape, and/or locations from the holes of the original partition and/or have a configuration that is different from that of the original partition and/or be adapted to have an angle of disposition which is different from that of the original partition. It is preferable to seal the partition against the sides of the trough so that the only passageways for particulate from the particulate receiving chamber to the evacuation chamber is through the holes in the partition.

Figure 7:
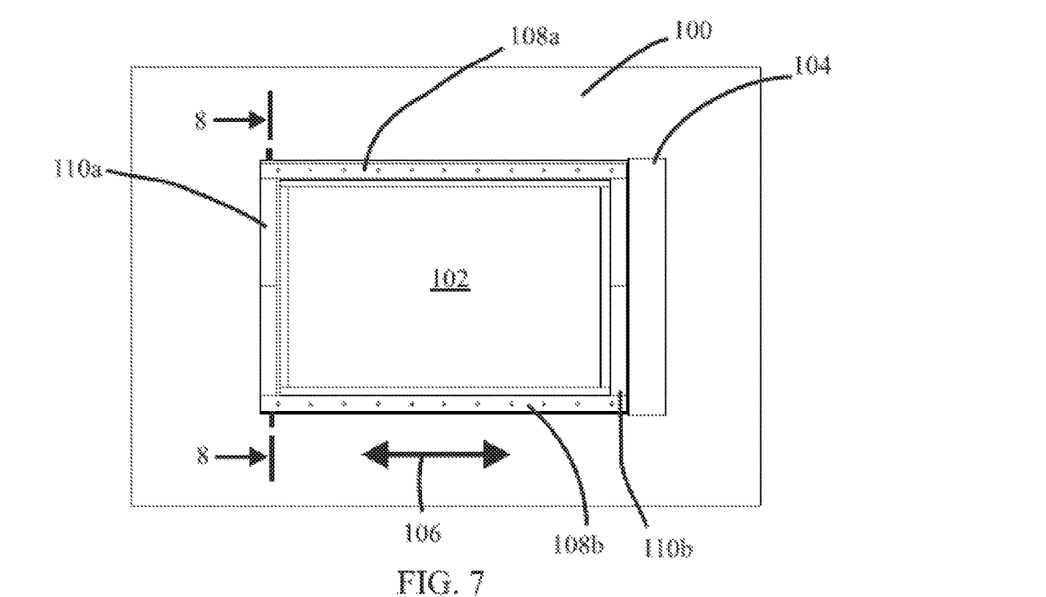
FIG. 7 is a schematic top view of a work table of a three-dimensional printer having troughs in accordance with an embodiment of the present invention.

The present invention includes three-dimensional printing apparatuses having of one or more of the inventive troughs which are adapted to directly and/or indirectly collect the excess deposited particulates appurtenant to the deposition of particulate layers during the three-dimensional printing operation. Preferably, the trough or troughs are positioned adjacent to the build platform so as to directly receive the excess deposited particulate, e.g. in the relative locations of conventional troughs 16a-16d shown in FIG. 2. In some embodiments, one or more inventive troughs (i.e. troughs having some version of the evacuation chamber system described above) are used in conjunction with one or more conventional troughs. In some of these embodiments, at least one of the conventional troughs conveys some or all of the excess deposited particulate into one or more of the inventive troughs. FIG. 7 shows such an embodiment.

Figure 8:
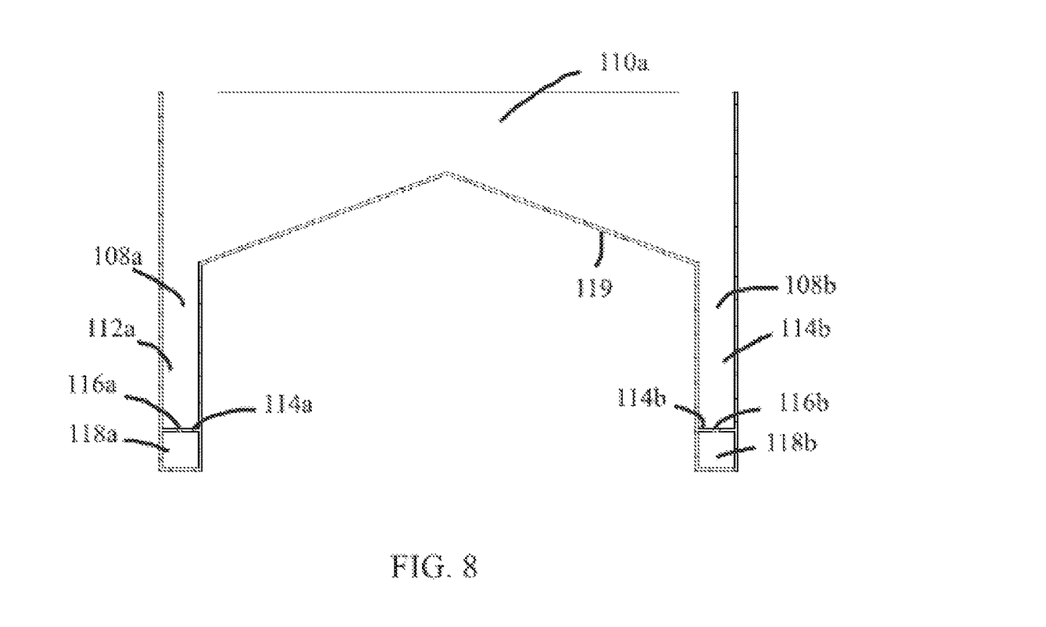
FIG. 8 is a schematic cutaway side view taken across cutting plane 8-8 of FIG. 7.

Referring to FIG. 7, there is shown a schematic top view of a work table 100 of a three-dimensional printer that uses a particulate build material. A build platform 102 is located within the work table 100. A particulate dispenser 104 is located above the work table 100 and is adapted to deposit layers of particulate material onto the build platform 102. In contrast to the particulate dispenser 6 of FIG. 1A-1D which was adapted to deposit particulate layers only when moving in the one direction indicated by arrow 8 in FIG. 1B, the particulate dispenser 104 is adapted to deposit particulate layers when moving in either of the directions indicated by the arrow 106, so that the particulate dispenser 104 has two alternate deposition directions. Two inventive troughs 108a, 108b are positioned adjacent to the build table and parallel to the deposition directions of the particulate dispenser 104. Two conventional troughs 110a, 110b are positioned adjacent to the ends of the build platform and are adapted to feed excess particulate material into the inventive troughs 108a, 108b. Thus, in this arrangement, each of the inventive troughs 108a, 108b are adapted to receive excess deposited particulate directly from the particulate dispenser 104 and to receive excess deposited particulate indirectly by way of the conventional troughs 110a, 110b. FIG. 8 presents a schematic cutaway side view taken across cutting plane 8-8 of FIG. 7.

Referring to FIG. 8, the conventional trough 110a is positioned between inventive troughs 108a, 108b. The inventive troughs 108a, 108b, have, respectively, particulate receiving chambers 112a, 112b, partition plates 114a, 114b (having through holes such as holes 116a, 116b), and evacuation chambers 118a, 118b. The conventional trough 110a has a peaked bottom 119 which slopes so as to direct excess deposited particulate toward the particulate receiving chambers 112a, 112b of the inventive troughs 108a, 108b.

Figure 9:
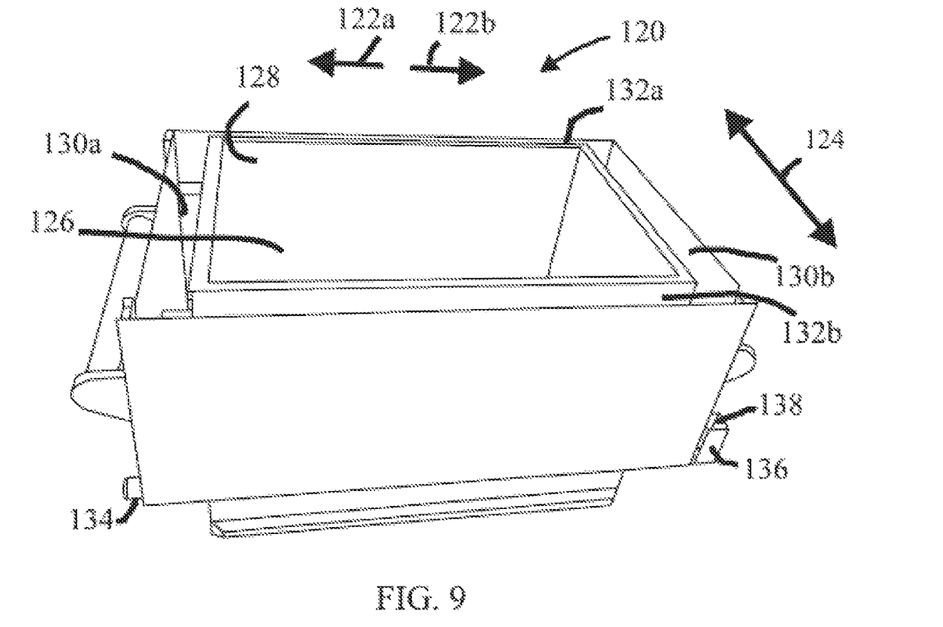
FIG. 9 is a schematic perspective view of a removable build box according to an embodiment of the present invention.

In some embodiments, the inventive troughs are built directly into the three-dimensional printing apparatus so that they are a permanent part of the apparatus. FIG. 7 illustrates one such embodiment. In other embodiments, one or more of the inventive troughs are disposed in a removable unit which is adapted to be inserted into the three-dimensional printing apparatus during a particular three-dimensional printing operation and then removed thereafter. In some particularly preferred embodiments, the removable unit also includes a build box having walls designed to laterally confine the particulate bed and a build platform which is adapted to be raised or lowered. FIG. 9 is a perspective view of a build box 120 of such an embodiment.

Referring to FIG. 9, the build box 120 is adapted to be inserted and withdrawn through the side of a three-dimensional printing apparatus in the directions indicated by the first arrow 122a (insertion direction) and the second arrow 122b (withdrawal direction). The third arrow 124 indicates the particulate spreading or deposition direction during the operation of the three-dimensional printing apparatus. The build box 120 has a build cavity 126 which is adapted to receive a particle bed during the building of a three-dimensional article. The build cavity 126 is bordered along its sides by four vertical walls, e.g. wall 128, and along its bottom by a vertically-movable build platform (not shown). The build box 120 also has two conventional troughs 130a, 130b and two inventive troughs 132a, 132b. The build box 120 also has nipple 134 which is adapted to connect the inventive trough 132b to a vacuum source and a particulate outflow restrictor 136 which has an open top 138 and is in communication with the gas inlet (not shown) for inventive trough 132b. Although they are not visible in FIG. 9, the build box 120 also includes a corresponding nipple and particle outflow restrictor with a gas inlet for inventive trough 132a.

Figure 10:
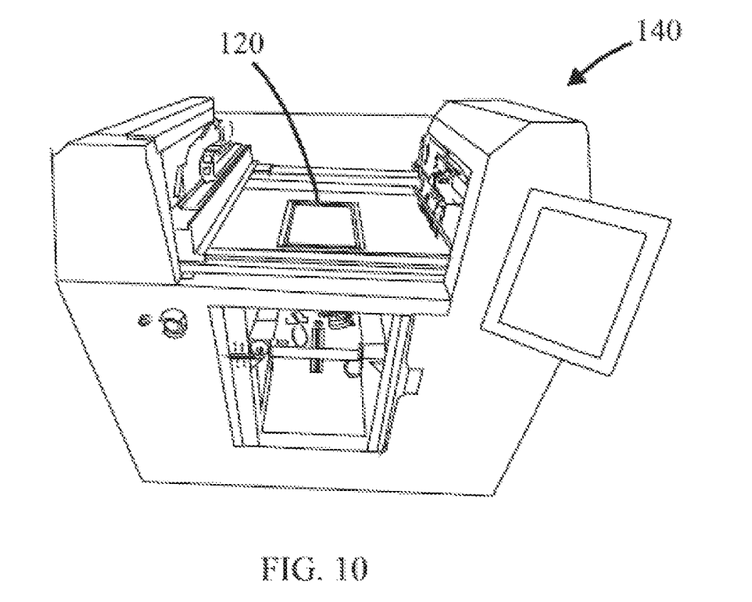
FIG. 10 is a schematic perspective view of a three-dimensional printer into which the build box of FIG. 9 has been inserted in accordance with an embodiment of the present invention.

FIG. 10 shows a schematic perspective view of a three-dimensional printer 140 into which the build box 120 has been inserted.

It is to be understood that the present invention includes within its scope three-dimensional printers that have build cavities that have one or more non-planar walls for laterally confining the build bed. For example, one or more of the walls may be curved. The build cavity may have a circular cross-section circumscribed by a continuously curved wall. Such non-planar walled build cavities may be either a permanent part of the three-dimensional printing apparatus of part of a removable build box.

It is also to be understood that the troughs of embodiments may have curved shapes. Such curved shaped troughs are preferred for use adjacent to a curved build cavity wall. Such curved troughs may be either a permanent part of the three-dimensional printing apparatus or removable, e.g., as part of a build box. Troughs having a curved shape may be either the troughs having an evacuation chamber or troughs not having an evacuation chamber.

In some embodiments, the particulates which are removed from a trough's evacuation chamber are subsequently collected in a collection device, e.g. a cyclone, screen separator, electrostatic precipitator, scrubber, etc. Preferably, the collection device is chosen so as to permit reuse of the collected particulate in the three-dimensional printing process with little or no subsequent conditioning operation. Although the collection device may be an integral part of the three-dimensional printer apparatus, preferably the collection device is either removably attached to the three-dimensional printer apparatus or is separate from the three-dimensional printer apparatus. These latter two configurations make it easier to avoid cross-contamination when the three-dimensional printer apparatus is first used for one type of particulate and then another type.

The present invention also includes methods of making articles with a three-dimensional printer apparatus which utilizes one or more of the inventive troughs. In such embodiments, the methods include providing a three-dimensional printer apparatus with at least one trough having a particulate receiving chamber, an evacuation chamber, and a selectively perforated partition separating the particulate receiving chamber from the evacuation chamber. The trough is positioned to receive excess deposited particulate material during the three-dimensional printing operation and is connected to a vacuum source. A vacuum source is intermittently or continuously operatively connected to the evacuation chamber and to cause a flow of ambient gas through the evacuation chamber which entrains at least a portion of the excess deposited particulate which entered the trough's particulate receiving chamber and removes the entrained particulate from the evacuation chamber. Some method embodiments also include the steps of inserting a removable build box into the three-dimensional printing apparatus prior to the printing operation and then removing the build box after the completion of the printing operation.

Some method embodiments also include the step of selectively closing one or more partition perforations so as to control the gas flow through the partition in which the perforation is located. The step has the effect of controlling the amount particulate flow through the partition. The closing may be done by selectively and removably inserting a plug into one or more of the perforations. The closing may also be done by selectively and removably attaching a strip that is adapted to attach to the partition so as to close a plurality of perforations.

While only a few embodiments of the present invention have been shown and described, it will be obvious to those skilled in the art that many changes and modifications may be made thereunto without departing from the spirit and scope of the invention as described in the claims. All United States patents and patent applications, all foreign patents and patent applications, and all other documents identified herein are incorporated herein by reference as if set forth in full herein to the full extent permitted under the law.

What is claimed is:

1. A three-dimensional printing apparatus (140) adapted for building articles from a particulate comprising a work table (100) and an excess-particulate receiving trough (30) having an open top (36) and disposed within the work table (100), the trough (30) comprising a chamber defined by a plurality of sides (32), a bottom (34), and the open top (36), a partition (70) having a semi-hyperbolic longitudinal profile, a gas inlet (46), and a gas outlet (48) wherein the partition (70) is disposed longitudinally within the chamber proximal to the bottom (34) thereby dividing the chamber into an upper chamber (42) and a lower chamber (44), the gas outlet (48) is disposed at a first end of the lower chamber (44), the gas inlet (46) is disposed at a second end of the lower chamber (44), the partition (70) has a plurality of through-holes (40) adapted to permit gas flow and particulate flow from the upper chamber (42) into the lower chamber (44), and the gas outlet (48) is adapted to be connected to a vacuum source.

2. The three-dimensional printing apparatus (140) of claim 1 further comprising a plug (166) adapted to removably attach to the partition (70) so as to selectively close one of the through-holes (40) of the plurality of through-holes (40).

3. The three-dimensional printing apparatus (140) of claim 1 further comprising a strip (170) adapted to removably attach to the partition (70) so as to selectively close at least two through-holes (40) of the plurality of through-holes (40).

4. The three-dimensional printing apparatus (140) of claim 1 further comprising a particulate outflow restrictor (136), the particulate outflow restrictor (146) being in fluid communication with the gas inlet (46) and the lower chamber (44).

5. A build box (120) adapted to be removably receivable by a three-dimensional printing apparatus (30) adapted for building articles from particulate, the build box (120) comprising a build cavity (126) and an excess-particulate receiving trough (132a) disposed adjacent to the build cavity (126), the trough (132a) comprising a chamber defined by a plurality of sides (32), a bottom (34), and the open top (36), a partition (70) having a semi-hyperbolic longitudinal profile, a gas inlet (46), and a gas outlet (48), wherein the partition (70) is disposed longitudinally within the chamber proximal to the bottom (34) thereby dividing the chamber into an upper chamber (42) and a lower chamber (44), the gas outlet (48) is disposed at a first end of the lower chamber (44), the gas inlet (46) is disposed at a second end of the lower chamber (44), the partition (70) has a plurality of through-holes (40) adapted to permit gas flow and particulate flow from the upper chamber (42) into the lower chamber (44), and the gas outlet (48) is adapted to be connected to a vacuum source.

6. The build box (120) of claim 5 further comprising a plug (166) adapted to removably attach to the partition (70) so as to selectively close one of the through-holes (40) of the plurality of through-holes (40).

7. The build box (120) of claim 5 further comprising a strip (170) adapted to removably attach to the partition (70) so as to selectively close at least two through-holes (40) of the plurality of through-holes (40).

8. The build box (120) of claim 5 further comprising a particulate outflow restrictor (136), the particulate outflow restrictor (146) being in fluid communication with the gas inlet (46) and the lower chamber (44).

* * * * *